United States Patent
Sonobe et al.

(10) Patent No.: US 8,758,911 B2
(45) Date of Patent: Jun. 24, 2014

(54) PERPENDICULAR MAGNETIC RECORDING MEDIUM AND PERPENDICULAR MAGNETIC RECORDING MEDIUM MANUFACTURING METHOD

(75) Inventors: Yoshiaki Sonobe, Shinjuku-ku (JP); Kong Kim, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 568 days.

(21) Appl. No.: 12/602,446

(22) PCT Filed: May 30, 2008

(86) PCT No.: PCT/JP2008/060052
§ 371 (c)(1),
(2), (4) Date: Nov. 30, 2009

(87) PCT Pub. No.: WO2008/149812
PCT Pub. Date: Dec. 11, 2008

(65) Prior Publication Data
US 2010/0190035 A1    Jul. 29, 2010

(30) Foreign Application Priority Data

May 30, 2007   (JP) .................................. 2007-144230

(51) Int. Cl.
*G11B 5/66* (2006.01)
*G11B 5/65* (2006.01)

(52) U.S. Cl.
CPC . *G11B 5/656* (2013.01); *G11B 5/66* (2013.01)
USPC .......................................... 428/829; 428/830

(58) Field of Classification Search
None
See application file for complete search history.

(56) References Cited

U.S. PATENT DOCUMENTS

| | | | | |
|---|---|---|---|---|
| 6,881,497 B2* | 4/2005 | Coffey et al. | | 428/828.1 |
| 7,572,526 B2* | 8/2009 | Berger et al. | | 428/828.1 |
| 7,678,476 B2* | 3/2010 | Weller et al. | | 428/828.1 |
| 7,867,638 B2* | 1/2011 | Sakawaki et al. | | 428/829 |
| 8,116,035 B2* | 2/2012 | Takahashi et al. | | 360/131 |

(Continued)

FOREIGN PATENT DOCUMENTS

| | | |
|---|---|---|
| JP | 2005-056555 A | 3/2005 |
| JP | 2006-048900 A | 2/2006 |
| JP | 2006-209943 A | 8/2006 |
| JP | 2008-176858 A | 7/2008 |

OTHER PUBLICATIONS

B. Ramamurthy Acharya, "Anisotropy Enhanced Dual Magnetic Layer Media Design for High-Density Perpendicular Recording", IEEE Transactions on Magnetics, Oct. 2005, pp. 3145-3147, vol. 41, No. 10.

S.N. Piramanayagam, "Stacked CoCrPt:SiO$_2$ Layers for Perpendicular Recording Media", IEEE Transactions on Mangetics, Oct. 2005, pp. 3190-3192, vol. 41, No. 10.

(Continued)

*Primary Examiner* — Kevin Bernatz

(57) ABSTRACT

A perpendicular magnetic recording medium is disclosed that includes a substrate, a main recording layer, a reinforcing layer, and a continuous layer which are overlaid in this order on the substrate. The reinforcing layer is provided between the main recording layer and the continuous layer so as to improve the S/N ratio of the magnetic recording medium and reduce the write fringing effect. The reinforcing layer has a granular structure. The saturation magnetization Ms of the reinforcing layer is higher than the saturation magnetization of the main recording layer.

8 Claims, 3 Drawing Sheets

(56) References Cited

U.S. PATENT DOCUMENTS

| | | | |
|---|---|---|---|
| 2003/0099869 A1* | 5/2003 | Oikawa et al. | 428/694 TM |
| 2006/0204791 A1* | 9/2006 | Sakawaki et al. | 428/828.1 |
| 2007/0020487 A1* | 1/2007 | Lim et al. | 428/836 |
| 2007/0231609 A1* | 10/2007 | Ajan et al. | 428/828.1 |
| 2008/0180843 A1* | 7/2008 | Zhang et al. | 360/135 |

OTHER PUBLICATIONS

Y. Sonobe et al., "Thermal Stability and SNR of Coupled Granular/Continuous Media", IEEE Transactions on Magnetics, Jul. 2001, pp. 1667-1670, vol. 37, No. 4.

Examination Report from Singapore patent application No. 200907931-0 issued Apr. 15, 2011.

\* cited by examiner

| Coupling Control Layer | | CoCr-TiO₂ | | Co-TiO₂ | |
|---|---|---|---|---|---|
| Absorbance | Thickness [nm] | Δ MWW [nm] | Δ BER | Δ MWW [nm] | Δ BER |
| 0.000 | 0.0 | 1.2 | 0.00 | 0.0 | 0.00 |
| 0.128 | 1.0 | 3.3 | 0.12 | 0.3 | -0.03 |
| 0.166 | 1.2 | 3.3 | 0.24 | 1.8 | -0.05 |
| 0.222 | 1.5 | 4.7 | 0.10 | 0.3 | -0.18 |
| 0.316 | 2.0 | 7.5 | 0.09 | 1.8 | -0.20 |
| 0.502 | 3.0 | 12.0 | 0.12 | 6.2 | -0.27 |
| 0.876 | 5.0 | 24.6 | 0.61 | 16.0 | -0.25 |

PERPENDICULAR MAGNETIC RECORDING MEDIUM AND PERPENDICULAR MAGNETIC RECORDING MEDIUM MANUFACTURING METHOD

TECHNICAL FIELD

This invention relates to a perpendicular magnetic recording medium adapted to be mounted in a HDD (hard disk drive) or the like and to a method of manufacturing the perpendicular magnetic recording medium.

BACKGROUND ART

Various information recording techniques have been developed following the increase in volume of information processing in recent years. Particularly, the recording density of HDDs using the magnetic recording technique has been increasing more and more. In order to achieve the high recording density in a magnetic disk for use in a HDD or the like, it is necessary to reduce the size of magnetic crystal grains forming a main recording layer serving to record information signals, and further, to reduce the thickness of the layer. However, in the case of conventionally commercialized magnetic disks of the in-plane magnetic recording type (also called the longitudinal magnetic recording type or the horizontal magnetic recording type), as a result of the reduction in size of magnetic crystal grains, there has arisen a so-called thermal fluctuation phenomenon where the thermal stability of recorded signals is degraded due to superparamagnetism so that the recorded signals are lost, which has thus become an impeding factor for the increase in recording density of the magnetic disks.

Particularly in recent years, the information recording capacity exceeding 120 GB has been required per, for example, 2.5-inch HDD magnetic disk. In order to achieve such an information recording capacity, the information recording density exceeding 200 Gbit/inch$^2$ is required. In order to achieve such an information recording density, there have been proposed magnetic disks of the perpendicular magnetic recording type instead of the above-mentioned in-plane magnetic recording type.

In the case of the perpendicular magnetic recording type, as different from the case of the in-plane magnetic recording type, the easy magnetization axis of a main recording layer is adjusted to be oriented in a direction perpendicular to a surface of a substrate, thereby preventing adjacent magnetizations from facing each other. As compared with the in-plane magnetic recording type, the perpendicular magnetic recording type can suppress the thermal fluctuation phenomenon and thus is suitable for increasing the recording density.

In order to obtain high thermal stability and excellent recording characteristics in such magnetic disks of the perpendicular magnetic recording type, there have been proposed composite media, such as a CGC perpendicular medium (e.g. Non-Patent Document 1), a stacked medium (e.g. Non-Patent Document 2), and a Cap medium (e.g. Non-Patent Document 3), in which a recording layer is formed by two or more layers.

Non-Patent Document 1: Y. Sonobe et al., IEEE Trans. Magn, vol. 37, 1667-1670 (2001)
Non-Patent Document 2: B. N. Piramanayagam, et. al., IEEE Trans. Magn, vol. 41, 3190-3192 (2005)
Non-Patent Document 3: B. A. Acharya, et. al., IEEE Trans. Magn, vol. 41, 3145-3147 (2005)

DISCLOSURE OF THE INVENTION

Problem to be Solved by the Invention

Also in the case of the perpendicular magnetic recording medium of the perpendicular magnetic recording type, like in the case of the in-plane magnetic recording medium, the increase in recording density of the magnetic disk is mainly based on whether or not the noise in a magnetization transition region of a main recording layer can be reduced, i.e. whether or not the S/N ratio (Signal to Noise ratio) can be improved. For reducing such magnetization transition region noise, measures are considered to improve the crystal orientation of the main recording layer, to magnetically isolate crystal grains, and to reduce the crystal grain size and the magnitude of magnetic interaction. That is, in order to increase the recording density of the medium, it is desirable to equalize and reduce the crystal grain size in the main recording layer and, further, to provide a segregated state where individual magnetic crystal grains are magnetically separated and thus the magnetic interaction is small.

The reduction in crystal grain size and the decrease in magnetic interaction described above are achieved using a two-layer structure of a granular layer as the main recording layer and a continuous layer. CoCrPt—$SiO_2$ or CoCrPt—$TiO_2$ is used as the main recording layer. This aims to reduce the magnetic grain size by a high-Ar sputtering process and, simultaneously, to segregate $SiO_2$ or $TiO_2$ at the grain boundaries to thereby reduce the magnetic interaction between the magnetic grains of the main recording layer. The thickness of $SiO_2$ or $TiO_2$ segregated at the grain boundaries affects the crystal grain size and the magnitude of the magnetic interaction. Therefore, by increasing $SiO_2$ or $TiO_2$, the S/N ratio in high recording density is improved.

On the other hand, the thermal stability and the easiness of writing are improved by increasing the thickness of the continuous layer to slightly increase the magnetic interaction (exchange amount) between the magnetic grains of the main recording layer. The continuous layer is a thin film (auxiliary recording layer) formed on the granular magnetic layer and adapted to exhibit high perpendicular magnetic anisotropy. The continuous layer aims to improve the reversed domain nucleation magnetic field Hn, the thermal fluctuation resistance, and the overwrite properties. As the continuous layer, use can be made of, for example, a CoCrPt or CoCrPtB film or the like. In the magnetic recording medium having such a structure, the exchange coupling is given between the magnetic grains of the magnetic layer through the continuous layer. However, if the thickness of the continuous layer is increased, there arises a problem that the track fringing increases to make it difficult to improve the track density.

This invention has been made in view of the above-mentioned problem inherent in the conventional magnetic recording medium and it is an object of this invention to provide a magnetic recording medium having a reinforcing layer between a main recording layer and a continuous layer so that it is possible to improve the S/N ratio of the magnetic recording medium and to reduce the write fringing by the new configuration.

Means for Solving the Problem

In order to solve the above-mentioned object, according to an aspect of this invention, there is provided a perpendicular magnetic recording medium comprising, over a substrate, a main recording layer having a granular structure in which magnetic grains are grown in a columnar shape, a continuous layer magnetically continuous in an in-plane direction, and a reinforcing layer that enhances magnetic coupling between the main recording layer and the continuous layer, wherein the reinforcing layer has a granular structure and a saturation magnetization Ms of the reinforcing layer is higher than a saturation magnetization Ms of the main recording layer. Herein, the main recording layer, the reinforcing layer, and the continuous layer may be formed in this order over the substrate.

When the saturation magnetization Ms of the reinforcing layer is smaller than that of the main recording layer, the BER (Bit Error Rate) decreases as the thickness of the reinforcing layer increases. However, when the saturation magnetization Ms of the reinforcing layer is higher than that of the main recording layer, the BER is improved as the thickness of the reinforcing layer increases so that the write fringing (erase width) decreases. Therefore, the recording density of the perpendicular magnetic recording medium is improved.

The saturation magnetization of the reinforcing layer is enhanced by the granular structure. By forming, for example, a Co—$TiO_2$ film as the reinforcing layer, high saturation magnetization can be achieved.

The saturation magnetization Ms of the reinforcing layer may also be higher than that of the continuous layer.

The function of this invention is achieved by setting the saturation magnetization of the reinforcing layer to be relatively high. Therefore, it is possible to obtain better BER by not setting the saturation magnetization of the continuous layer to be unnecessarily high and by setting the saturation magnetization of the reinforcing layer to be relatively higher than those of the main recording layer and the continuous layer.

The thickness of the reinforcing layer may be 5 nm or less, preferably 2 nm or less. The reinforcing layer becomes better in BER following its thickness. However, if the thickness exceeds a predetermined value, the BER decreases as in the case where the saturation magnetization is low. Therefore, by limiting the thickness as described above, excellent BER can be maintained.

The thickness of the continuous layer may be 10 nm or less, preferably 5 nm or less. The BER depends on not only the thickness of the reinforcing layer described above, but also the thickness of the continuous layer. By also limiting the continuous layer as described above, excellent BER can be maintained more stably.

The reinforcing layer may be such that a nonmagnetic substance is segregated between magnetic grains containing at least Co. Using Co, it is possible to easily obtain high saturation magnetization Ms. The reinforcing layer is required to have a hcp crystal structure and it is possible to alternatively use CoFe, CoNi, or the like.

The reinforcing layer may be one of Co—$TiO_2$, Co—$SiO_2$, and Co—$Cr_2O_3$. This is because since an oxide is segregated around magnetic grains formed by Co to form grain boundaries, a granular structure made of Co is formed.

The reinforcing layer may be such that a nonmagnetic substance is segregated between magnetic grains containing at least CoCrPt. This makes it possible to obtain high saturation magnetization Ms and to improve the S/N ratio. For obtaining high saturation magnetization, it is preferable that the ratio of Cr contained in the reinforcing layer be smaller than that of Cr contained in the main recording layer.

The thickness of the reinforcing layer is preferably ¼ times or less that of the main recording layer. This makes it possible to enhance the magnetic interaction by the continuous layer without reducing the S/N ratio.

The thickness of the reinforcing layer is preferably one time or less that of the continuous layer. This makes it possible to properly obtain the magnetic interaction by the continuous layer.

In order to solve the above-mentioned object, according to other aspect of this invention, there is provided a perpendicular magnetic recording medium comprising, over a substrate, a main recording layer having a granular structure in which a nonmagnetic substance is segregated between columnar magnetic grains, a continuous layer for giving an action to exchange-couple the magnetic grains to each other, and a reinforcing layer that enhances magnetic coupling between the main recording layer and the continuous layer, wherein the reinforcing layer has a granular structure and a saturation magnetization Ms of the reinforcing layer is higher than a saturation magnetization Ms of the main recording layer.

In order to solve the above-mentioned object, according to other aspect of this invention, there is provided a method of manufacturing a perpendicular magnetic recording medium having at least a main recording layer, a reinforcing layer, and a continuous layer in this order over a substrate, comprising:

forming, as the main recording layer, a ferromagnetic layer with a granular structure in which a nonmagnetic substance is segregated between magnetic grains containing at least cobalt (Co);

forming, as the reinforcing layer, a ferromagnetic layer with a granular structure in which a nonmagnetic substance is segregated between magnetic grains containing at least cobalt (Co) so that a saturation magnetization Ms of the reinforcing layer is higher than a saturation magnetization Ms of the main recording layer; and forming the continuous layer so as to be magnetically continuous in an in-plane direction.

The above-mentioned components and explanation thereof based on the technical idea of the perpendicular magnetic recording medium can also be applied to a method of manufacturing such a perpendicular magnetic recording medium.

Effect of the Invention

According to a magnetic recording medium of this invention, a reinforcing layer is provided between a main recording layer and a continuous layer so that it is possible to improve the S/N ratio of the magnetic recording medium and to reduce the write fringing by the new configuration. Therefore, it is possible to achieve a further improvement in recording density.

DESCRIPTION OF SYMBOLS

Figures 1, 2:
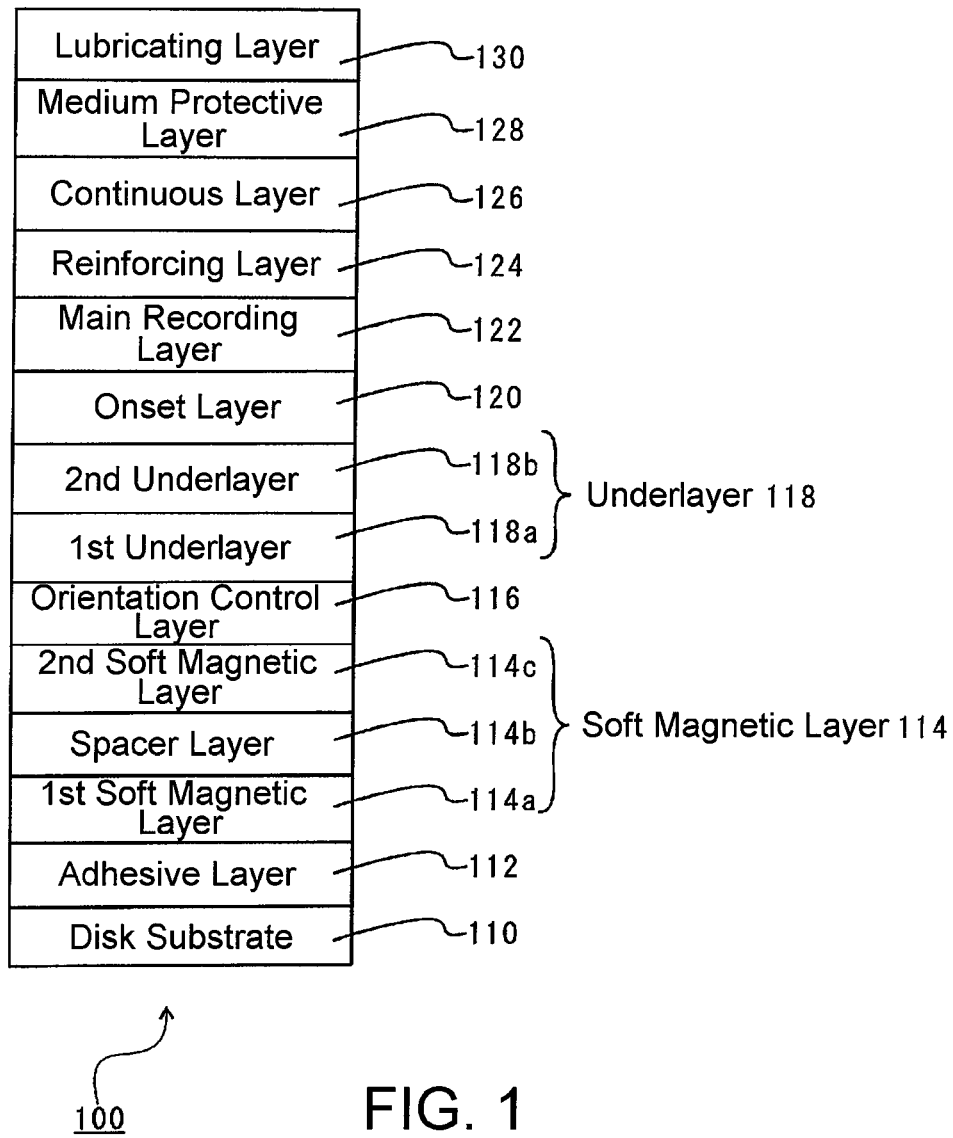
FIG. 1 is a sectional view showing the structure of a perpendicular magnetic recording medium.
FIG. 2 is a diagram showing measured values of the recording track width and BER with respect to change in film thickness.

100 perpendicular magnetic recording medium
110 disk substrate
112 adhesive layer 114 soft magnetic layer
116 orientation control layer
118 underlayer
120 onset layer
122 main recording layer
124 reinforcing layer
126 continuous layer
128 medium protective layer
130 lubricating layer

BEST MODE FOR CARRYING OUT THE INVENTION

Hereinbelow, a preferred embodiment of this invention will be described in detail with reference to the accompanying drawings. In this specification and the drawings, the same symbols are assigned to components having substantially the same functions and structures, thereby omitting redundant description.

(Magnetic Recording Medium 100)

FIG. 1 is a sectional view showing the structure of a perpendicular magnetic recording medium 100 according to this embodiment. The magnetic recording medium 100 can be formed by a substrate (disk substrate) 110, an adhesive layer 112, a soft magnetic layer 114, an orientation control layer 116, an underlayer 118, an onset layer 120, a main recording layer 122, a reinforcing layer (pinning layer) 124, a continuous layer 126, a medium protective layer 128, and a lubricating layer 130.

First, an amorphous aluminosilicate glass is molded into a disk shape by direct press, thereby producing a glass disk. This glass disk is ground, polished, and chemically strengthened in sequence, thereby obtaining the smooth nonmagnetic substrate (hereinafter referred to as a "disk substrate") 110 in the form of a chemically strengthened glass disk. Since smoothness and high rigidity are obtained, the aluminosilicate glass makes it possible to stably reduce the magnetic spacing, particularly the flying height of a magnetic head. Further, it is possible to obtain high rigidity and strength by chemically strengthening the aluminosilicate glass. In this event, the disk diameter is, for example, 65 mm. The surface roughness of a main surface of the disk substrate 110 was measured by an AFM (atomic force microscope) and it was a smooth surface shape with Rmax of 4.8 nm and Ra of 0.42 nm. Rmax and Ra follow Japanese Industrial Standard (JIS).

Using an evacuated film forming apparatus, the layers from the adhesive layer 112 to the continuous layer 126 are formed in sequence on the obtained disk substrate 110 in an Ar atmosphere by a DC magnetron sputtering method and then the medium protective layer 128 is formed by a CVD method. Thereafter, the lubricating layer 130 is formed by a dip coating method. In terms of capability of uniform film formation, it is also preferable to use a single-wafer film forming apparatus. Hereinbelow, the structures and manufacturing methods of the respective layers will be described.

The adhesive layer 112 is formed using a Ti-alloy target so as to be a Ti-alloy layer of 10 nm. By forming the adhesive layer 112, the adhesion between the disk substrate 110 and the soft magnetic layer 114 can be improved and, therefore, it is possible to prevent stripping of the soft magnetic layer 114. As a material of the adhesive layer 112, use may be made of, for example, a Ti-containing material. In terms of practical use, the thickness of the adhesive layer is preferably set to 1 nm to 50 nm.

The soft magnetic layer 114 is formed by interposing a nonmagnetic spacer layer 114b between a first soft magnetic layer 114a and a second soft magnetic layer 114c so as to have AFC (antiferro-magnetic exchange coupling). With this configuration, magnetization directions of the soft magnetic layer 114 can be aligned along a magnetic path (magnetic circuit) with high accuracy so that it is possible to reduce noise generated from the soft magnetic layer 114 because the perpendicular component of magnetization is extremely reduced. Specifically, the composition of the first soft magnetic layer 114a and the second soft magnetic layer 114c is CoFeTaZr and the composition of the spacer layer 114b is Ru (ruthenium).

The orientation control layer 116 has a function of protecting the soft magnetic layer 114 and a function of facilitating alignment of the orientation of crystal grains of the underlayer 118. The orientation control layer 116 is formed using NiW or NiCr having a fcc structure.

The underlayer 118 has a two-layer structure made of Ru. By forming a second underlayer 118b on the upper layer side at an Ar gas pressure higher than that used when forming a first underlayer 118a on the lower layer side, the crystal orientation can be improved.

The onset layer 120 is a nonmagnetic granular layer. By forming the nonmagnetic granular layer on a hcp crystal structure of the underlayer 118 and growing a granular layer of the main recording layer 122 thereon, the onset layer 120 has a function of separating the magnetic granular layer from an initial stage (buildup). The composition of the onset layer 120 is nonmagnetic $CoCr$—$SiO_2$.

The main recording layer 122 is, in this embodiment, a single magnetic layer with a granular structure. As the main recording layer, use can be made of $CoCrPt$—$Cr_2O_3$, $CoCrPt$—$SiO_2$, $CoCrPt$—$TiO_2$, or the like. A plurality of oxides may be contained in such a material. As a specific example, using a hard magnetic target made of CoCrPt containing silicon oxide ($SiO_2$) or titanium oxide ($TiO_2$) as an example of a nonmagnetic substance, a hcp crystal structure of 11 nm is formed. The main recording layer can be suitably set in a range of 20 nm or less. The composition of the target for forming the main recording layer 122 contains CoCrPt and $SiO_2$ (or $TiO_2$) in a ratio of about 9:1 (mol %). The nonmagnetic substance is segregated around the magnetic substance to form grain boundaries and magnetic grains form a columnar granular structure. These magnetic grains are epitaxially grown continuously from the granular structure of the onset layer.

The main recording layer 122 is not limited to the single layer, but may be in the form of two layers. When forming a main recording layer by two layers, it is possible to form different layers by, for example, making different the contents of an oxide or the compositions of oxides from each other. For example, an oxide of one layer may be $SiO_2$ to improve the separability and an oxide of the other layer may be $TiO_2$ to improve the electromagnetic conversion characteristics (particularly the S/N ratio), and by appropriately combining them, it is possible to obtain a main recording layer having both characteristics. Further, a plurality of oxides may be mixed into one or both of two layers of a main recording layer.

Using a hard magnetic target made of Co, CoPt, or CoCr containing silicon oxide ($SiO_2$) or titanium oxide ($TiO_2$) as an example of a nonmagnetic substance, the reinforcing layer 124 with a hcp crystal structure of, for example, 2 nm is formed, thereby assisting magnetization reversal of the main recording layer 122. The reinforcing layer 124 is preferably 5 nm or less and more preferably 2 nm or less. Also in the reinforcing layer 124, by forming magnetic grains into a granular structure as described above, it is possible to increase the magnetic coupling with the main recording layer 122, to increase the coercive force Hc, and to increase the saturation magnetization Ms. Adjustment of the saturation magnetization Ms is carried out by increasing the content of Co when the saturation magnetization Ms is small and by increasing the content of the oxide such as titanium oxide ($TiO_2$) when the saturation magnetization Ms is large. By increasing the content of the oxide in this manner, it is possible to achieve a reduction in crystal grain size and thus to narrow the McW (Magnetic core Width).

In this embodiment, the reinforcing layer 124 is formed so that the saturation magnetization Ms thereof becomes higher than those of the main recording layer 122 and the later-described continuous layer 126. For example, when the saturation magnetization Ms of the main recording layer (CoCrPt—$TiO_2$) is 400 to 500 emu/cc and the saturation magnetization of the continuous layer (CoCrPt—B) is about 300 to 400 emu/cc, excellent BER can be obtained by setting the saturation magnetization of the reinforcing layer to, for example, 800 emu/cc. The saturation magnetization Ms can be derived by stacking each film on a glass substrate and dividing, by the volume of each film, a value of the saturation magnetization measured using a VSM (Vibrating Sample Magnetometer). The difference between the saturation magnetization Ms of the reinforcing layer 124 and that of the main recording layer 122 or the continuous layer 126 is preferably 200 emu/cc or more.

In the continuous layer 126, the magnetism continues in an in-plane direction of the continuous layer 126. As the continuous layer, use can be made of, for example, a CoCrPt or CoCrPtB film or the like. The thickness of the continuous layer 126 is preferably 10 nm or less and more preferably 5 nm or less.

The medium protective layer 128 is formed by film formation of carbon by the CVD method while maintaining a vacuum. The medium protective layer 128 is a protective layer for protecting the main recording layer 122 from an impact of a magnetic head. Since, in general, carbon formed into a film by the CVD method is improved in film hardness as compared with that by the sputtering method, it is possible to protect the main recording layer 122 more effectively against the impact from the magnetic head.

The lubricating layer 130 is formed of PFPE (perfluoropolyether) by the dip coating method. The thickness of the lubricating layer 130 is about 1 nm. The perfluoropolyether has a straight chain structure to thereby exhibit proper lubrication performance for a magnetic disk and, because of having hydroxyl groups (OH) as end groups, it can exhibit high adhesion performance with respect to a carbon medium protective layer.

Herein, a description will be given of a difference between proving the reinforcing layer 124 as in this embodiment and forming a main recording layer by two layers (or three layers). As described above, the reinforcing layer 124 has the magnetism and contributes to recording of signals. Therefore, in one view, the reinforcing layer 124 can also be regarded as one of recording layers. Incidentally, as described above, in order to achieve the improvement in S/N ratio and the reduction in write fringing in response to the demand for the increase in recording density, the continuous layer 126 is provided to generate the magnetic interaction (exchange coupling) between the granular magnetic grains of the main recording layer. For enhancing the exchange coupling, it is considered to increase the thickness of the continuous layer 126 and to enhance the saturation magnetization Ms of the continuous layer or the recording layer. However, the thickness dependence of the exchange coupling is highly sensitive and thus it is extremely difficult to obtain a desired-magnitude exchange coupling (to accurately control the thickness of the continuous layer). Further, if the thickness of the continuous layer is increased or if the saturation magnetization Ms of the continuous layer is enhanced, since the magnetic permeability in the in-plane direction increases more than the exchange coupling increases, a leakage magnetic field to surrounding magnetic grains increases to increase the track fringing. Further, there is a problem that if the saturation magnetization Ms of the recording layer is enhanced, the S/N ratio decreases on the whole.

Under these circumstances, the present inventors have found that high saturation magnetization Ms of only a surface layer of the recording layer is sufficient for enhancing the exchange coupling by the continuous layer 126, and have completed the invention of this application. That is, the reinforcing layer 124 aims to enhance the saturation magnetization Ms of the surface layer of the main recording layer, but does not aim to hold a signal. As a structure reflecting this aim, the reinforcing layer 124 has the saturation magnetization Ms higher than that of the main recording layer 122 or the continuous layer 126 and preferably has a thin thickness.

Concerning the thickness of the reinforcing layer 124 with respect to the main recording layer 122, the thickness of the reinforcing layer 124 can be set in a range in which the main recording layer 122 is 20 nm or less, and is preferably 5 nm or less and more preferably 2 nm or less. Thus, the thickness of the reinforcing layer 124 is preferably ¼ times or less that of the main recording layer 122. Concerning the thickness of the reinforcing layer 124 with respect to the continuous layer 126, the thickness of the continuous layer 126 is preferably 10 nm or less and more preferably 5 nm or less and the thickness of the reinforcing layer 124 is preferably 5 nm or less and more preferably 2 nm or less. Thus, the thickness of the reinforcing layer 124 is preferably one time or less that of the continuous layer 126.

Hereinbelow, the effectiveness of this embodiment will be described using Examples and a Comparative Example.

Example 1

Herein, an amorphous aluminosilicate glass was molded into a disk shape by direct press, thereby producing a glass disk. This glass disk was ground, polished, and chemically strengthened in sequence, thereby obtaining a smooth non-magnetic disk substrate in the form of a chemically strengthened glass disk. The glass substrate was a 2.5-inch magnetic disk substrate having a diameter of 65 mm, an inner diameter of 20 mm, and a disk thickness of 0.635 mm. Herein, the surface roughness of the obtained glass substrate was measured by an AFM (atomic force microscope) and it was confirmed to be a smooth surface with Rmax of 2.18 nm and Ra of 0.18 nm. Rmax and Ra follow Japanese Industrial Standard (JIS).

Then, using a sputtering film forming apparatus, the adhesive layer 112, the soft magnetic layer 114, the orientation control layer 116, the underlayer 118, the onset layer 120, and the main recording layer 122 were formed in sequence on the disk substrate 110 by DC magnetron sputtering.

First, the adhesive layer 112 was formed using a CrTi target so as to be a CrTi layer of 10 nm.

Then, the soft magnetic layers 114a and 114c were formed using a FeCoTaZr target so as to be amorphous FeCoTaZr layers of 30 nm, respectively. As the spacer layer 114b between the soft magnetic layers 114a and 114c, a Ru layer of 2 nm was formed using a Ru target.

Then, on the soft magnetic layer 114, the orientation control layer 116 of 12 nm made of NiW, the underlayers 118a and 118b each having a thickness of 14 nm and made of Ru (film forming gas pressure for Ru layer of the underlayer 118a: 1.5 Pa, film forming gas pressure for Ru layer of the underlayer 118b: 6.0 Pa), the onset layer 120 of 0.5 nm made of CoCr—$SiO_2$, the main recording layer 122 of CoCrPt—$TiO_2$, the reinforcing layer 124, the continuous layer 126, and the medium protective layer 128 were formed in sequence.

The main recording layer 122 of 15 nm having a hcp crystal structure was formed using a hard magnetic target made of CoCrPt—$TiO_2$. Further, the reinforcing layer 124 and the continuous layer 126 were formed using a Co—$TiO_2$ target and a CoCrPtB target, respectively. Herein, the thickness of the reinforcing layer 124 was changed to 0, 1.0, 1.2, 1.5, 2.0, 3.0, and 5.0 nm and the recording track width and BER for the respective thicknesses were measured. The measurement results will be described in detail using FIG. 2.

Next to the continuous layer 126, the medium protective layer 128 made of hydrogenated carbon was formed by the CVD method. Because of being made of hydrogenated carbon, the film hardness is improved and thus it is possible to protect the perpendicular main recording layer against an impact from a magnetic head.

Then, the lubricating layer 130 made of PFPE (perfluoropolyether) was formed by the dip coating method. The thickness of the lubricating layer 130 was 1 nm.

Comparative Example of Example 1

In the same film structure as in Example 1 described above, a CoCr—$TiO_2$ control layer was stacked instead of the Co—$TiO_2$ reinforcing layer 124. The thickness of the reinforcing layer 124 was changed to 0, 1.0, 1.2, 1.5, 2.0, 3.0, and 5.0 nm.

The recording/reproducing characteristics of the media thus obtained were evaluated by using a R/W analyzer and a magnetic head of the perpendicular magnetic recording type having a SPT element on the recording side and a GMR element on the reproducing side and by setting the recording density to 1056 kfci. In this event, the flying height of the magnetic head was 10 nm.

Figure 3:
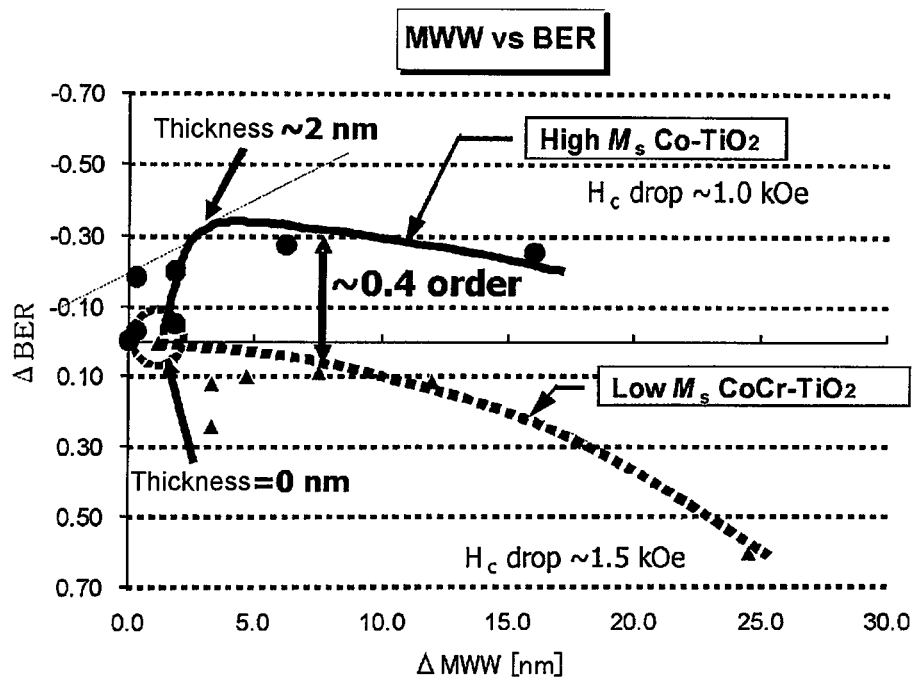
FIG. 3 is a diagram showing change in BER with respect to the recording track width.

FIG. 2 shows measured values of the recording track width (MWW: Magnetic Write Width) and BER with respect to change in film thickness and FIG. 3 shows change in BER with respect to the recording track width in FIG. 2. Herein, the samples of the above-mentioned Example 1 and Comparative Example were measured under a condition capable of achieving 100 Gbit/$inch^2$. FIG. 3 shows relative track width increase width ΔMWW and relative BER change width ΔBER using as a reference a track width when no reinforcing layer is included.

For example, in FIG. 3, in the samples (CoCr—$TiO_2$) of the Comparative Example, since the saturation magnetization Ms is small, the BER decreases as the thickness of the reinforcing layer increases, while, in the samples (Co—$TiO_2$) of Example 1, since the saturation magnetization is high, as the thickness increases, the BER is improved by, for example, about 0.4 in a region where the thickness of the reinforcing layer is 2 nm or less. If the film thickness of the sample (Co—$TiO_2$) of Example 1 is increased to exceed 2 nm, then the coercive force Hc of the recording medium decreases. However, it is understood that high BER can be maintained up to a thickness of about 5 nm.

In FIG. 3, it is ideal to improve the BER while maintaining (without changing) the track width. Therefore, since Example 1 can sharply increase the BER without changing ΔMWW so much when the film thickness of the sample is 2 nm or less, it can be said to be close to the ideal state.

Calculation using the LLG (Landau-Lifschitz-Gilbert) equation was also performed by changing the saturation magnetization Ms of the reinforcing layer 124 and, also in the results thereof, it was confirmed that as the magnetization density Ms increased, the track erase width decreased and simultaneously the BER was improved, i.e. the S/N ratio was improved.

Example 2

The BER depends on not only the thickness of the reinforcing layer 124 described above, but also the thickness of the continuous layer 126.

Figure 4:
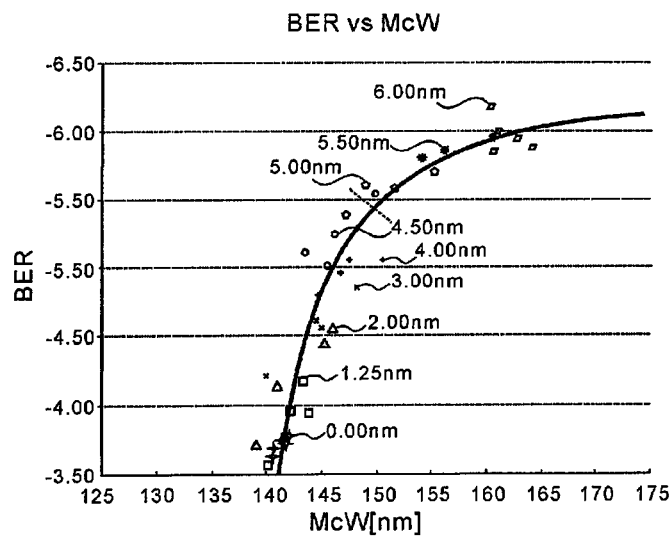
FIG. 4 is a diagram showing the relationship between the film thickness and the normalized write fringing amount.

FIG. 4 shows the relationship between McW and BER obtained by changing the thickness of the continuous layer 126 using the basic structure shown in Example 1. Herein, the McW is the sum of the recording track width MWW and the write fringing (erase width). In this event, the thickness of the main recording layer 122 was 12 nm.

Referring to FIG. 4, when the thickness of the continuous layer is 5 nm or less, it is possible to obtain a sharp improvement in BER with respect to an increase in McW. In a region where the thickness is 5 nm or more and 10 nm or less, although an improvement in BER is expected, an increase in McW is also induced. Therefore, the continuous layer 126 is set to 10 nm or less, preferably 5 nm or less.

From Example 1 and Example 2 described above, when the reinforcing layer 124 is 2 nm or less and the continuous layer 126 is 5 nm or less, the effect of the reinforcing layer 124 becomes large so that the BER can be improved while suppressing an increase in McW.

Example 3

In this embodiment, when Co—$TiO_2$ is inserted as the reinforcing layer 124, there is also exhibited an effect that the erase width is also reduced.

Figure 5:
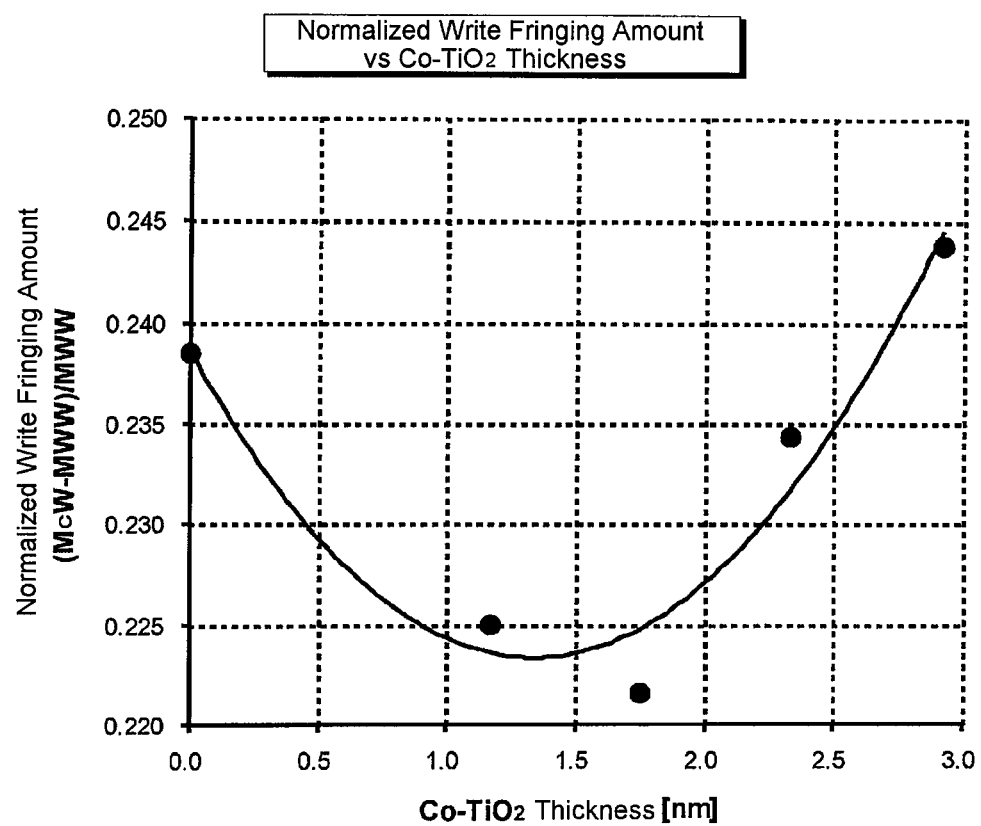
FIG. 5 shows the relationship between the thickness of a reinforcing layer and the normalized write fringing amount.

FIG. 5 shows the relationship between the thickness of the reinforcing layer 124 and the normalized write fringing amount ((McW−MWW)/MWW). According to FIG. 5, in a range in which Hc of the perpendicular magnetic recording medium 100 does not decrease, if the thickness of the reinforcing layer 124 is increased, the normalized fringing amount, i.e. the erase width, decreases without causing a change in BER. The results of this qualitatively agree with the LLG calculation results.

According to the perpendicular magnetic recording medium 100 described above, the reinforcing layer 124 is provided between the main recording layer 122 and the continuous layer 126 so that it is possible to improve the S/N ratio of the perpendicular magnetic recording medium 100 and to reduce the write fringing by the new configuration. Therefore, it is possible to achieve a further improvement in recording density.

While the preferred embodiment of this invention has been described with reference to the accompanying drawings, it is needless to say that this invention is not limited thereto. It is apparent that a person skilled in the art can think of various changes and modifications in the category described in claims and it is understood that those also naturally belong to the technical scope of this invention.

INDUSTRIAL APPLICABILITY

This invention is applicable to a perpendicular magnetic recording medium adapted to be mounted in a HDD or the like and to a method of manufacturing the perpendicular magnetic recording medium.

The invention claimed is:

1. A perpendicular magnetic recording medium comprising, over a substrate, a main recording layer having a granular structure in which magnetic grains are grown in a columnar shape, a continuous layer magnetically continuous in an in-plane direction, and a reinforcing layer, wherein the main recording layer, the reinforcing layer, and the continuous layer are formed in this order over the substrate and wherein:
the reinforcing layer has a granular structure and a saturation magnetization Ms of the reinforcing layer is at least 200 emu/cc higher than a saturation magnetization Ms of the main recording layer and at least 200 emu/cc higher than a saturation magnetization of the continuous layer;
the reinforcing layer is any one of $Co-TiO_2$, $Co-SiO_2$, and $Co-Cr_2O_3$; and
the reinforcing layer has a thickness of 2 nm or less.

2. A perpendicular magnetic recording medium according to claim 1, wherein the continuous layer has a thickness of 10 nm or less.

3. A perpendicular magnetic recording medium according to claim 1, wherein the continuous layer has a thickness of 5 nm or less.

4. A perpendicular magnetic recording medium according to claim 1, wherein the reinforcing layer is formed by segregating a nonmagnetic substance between magnetic grains containing at least CoCrPt.

5. A perpendicular magnetic recording medium according to claim 1, wherein the reinforcing layer has a thickness which is ¼ times or less that of the main recording layer.

6. A perpendicular magnetic recording medium according to claim 1, wherein the reinforcing layer has a thickness which is one time or less that of the continuous layer.

7. A perpendicular magnetic recording medium comprising, over a substrate, a main recording layer having a granular structure in which a nonmagnetic substance is segregated between columnar magnetic grains, a continuous layer for giving an action to exchange-couple the magnetic grains to each other, and a reinforcing layer, wherein the main recording layer, the reinforcing layer, and the continuous layer are formed in this order over the substrate and wherein:
the reinforcing layer has a granular structure and a saturation magnetization Ms of the reinforcing layer is at least 200 emu/cc higher than a saturation magnetization Ms of the main recording layer and at least 200 emu/cc higher than a saturation magnetization of the continuous layer;
the reinforcing layer is any one of $Co-TiO_2$, $Co-SiO_2$, and $Co-Cr_2O_3$; and
the reinforcing layer has a thickness of 2 nm or less.

8. A method of manufacturing a perpendicular magnetic recording medium having at least a main recording layer, a reinforcing layer, and a continuous layer in this order over a substrate, comprising:
forming, as the main recording layer, a ferromagnetic layer with a granular structure in which a nonmagnetic substance is segregated between magnetic grains containing at least cobalt (Co);
forming, as the reinforcing layer, a ferromagnetic layer with a granular structure in which a nonmagnetic substance is segregated between magnetic grains containing at least cobalt (Co) so that a saturation magnetization Ms of the reinforcing layer is at least 200 emu/cc higher than a saturation magnetization Ms of the main recording layer and at least 200 emu/cc higher than a saturation magnetization of the continuous layer, wherein the reinforcing layer is any one of $Co-TiO_2$, $Co-SiO_2$, and $Co-Cr_2O_3$; and the reinforcing layer has a thickness of 2 nm or less; and
forming the continuous layer so as to be magnetically continuous in an in-plane direction.

* * * * *